United States Patent [19]

Takahashi et al.

[11] 4,015,274
[45] Mar. 29, 1977

[54] MEMORY DEVICE OF AN ELECTRICAL SHUTTER FOR SINGLE LENS REFLEX CAMERA

[75] Inventors: Akira Takahashi, Tokyo; Masamichi Furukawa, Kawasaki, both of Japan

[73] Assignee: Ricoh Co., Ltd., Tokyo, Japan

[22] Filed: July 7, 1975

[21] Appl. No.: 593,295

Related U.S. Application Data

[63] Continuation-in-part of Ser. No. 414,643, Nov. 12, 1973, abandoned.

[30] Foreign Application Priority Data

Nov. 13, 1972 Japan .............................. 47-113649
Nov. 13, 1972 Japan .............................. 47-113650

[52] U.S. Cl. ........................... 354/23 D; 354/60 A; 354/60 L
[51] Int. Cl.$^2$ ................... G03B 7/00; G03B 7/08; G03B 17/20
[58] Field of Search .......... 354/23 D, 50, 51, 60 A, 354/60 L

[56] References Cited

UNITED STATES PATENTS

| | | | |
|---|---|---|---|
| 3,703,130 | 11/1972 | Watanabe | 354/23 D |
| 3,807,879 | 4/1974 | Mori | 354/23 D |
| 3,824,608 | 7/1974 | Toyoda | 354/23 D |
| 3,828,253 | 8/1974 | Mori | 354/23 D |
| 3,843,249 | 10/1974 | Kitaura | 354/23 D |
| 3,895,875 | 7/1975 | Kitaura et al. | 354/53 |
| 3,899,788 | 8/1975 | Toyoda | 356/226 |

*Primary Examiner*—Russell E. Adams, Jr.
*Attorney, Agent, or Firm*—Cooper, Dunham, Clark, Griffin & Moran

[57] ABSTRACT

A memory device is provided for storing a photometric quantity that is sensed and photoelectrically converted, by a light receiving element disposed in the light path of the finder of a single lens reflex camera, and used for determining a shutter speed or exposure time, which device includes an analogue-digital converter for conversion of the photometric quantity into a digital quantity, and which converter includes a digital-analogue converter having a plurality of storage elements which correspond in number to one more than the number of manually settable change-over steps of the shutter speed.

7 Claims, 16 Drawing Figures

MEMORY DEVICE OF AN ELECTRICAL SHUTTER FOR SINGLE LENS REFLEX CAMERA

CROSS REFERENCE TO RELATED APPLICATION

This is continuation-in-part of applicant's copending application Ser. No. 414,643 executed Oct. 18, 1973 and filed on or about Nov. 12, 1973 for Memory Device of an Electrical Shutter for Single Lens Reflex Camera, now abandoned.

BACKGROUND OF THE INVENTION

The invention relates to a memory device for an electrical shutter for single lens reflex cameras.

A single lens reflex camera includes a movable reflecting mirror disposed at an inclination of 45° between a taking lens and a film surface so as to supply the light which is transmitted through the taking lens to the light path of a finder in order to focus an image at a position conjugate to the film surface, which image is viewed through an eyepiece and Pentadachprism (pentaprism), thereby enabling the same image as the one to be taken to be viewed through the finder.

In such a camera, a proper determination of exposure factors such as shutter speed, diaphragm aperture or the like is automatically effected by conducting photometry prior to taking a picture, by means of a light receiving element located in the light path of the finder. This technique is known as TTL (through-the-lens) photometry. When an electrical shutter is applied to such a camera, because the movable reflecting mirror is retracted from the taking light path thereby by closing the light path of the finder, the incidence of light on the light receiving element which is located in the light path of the finder for determining the shutter time is interrupted, which results in the difficulty that a proper exposure time cannot be determined by the electrical shutter. To avoid such difficulty, it is conventional when an electrical shutter is applied to a single lens reflex camera to store the photometric value, obtained before the movable reflecting mirror is retracted from the taking light path, in some form which enables a proper shutter time to be determined in accordance with the stored photometric value.

Both analogue and digital memory means are available for storing the photometric value. The analogue means may comprise a CdS light receiving element, and a acapacitor which stores the voltage developed across the CdS element in a form in which it is logarithmically compacted against the amount of light, the stored value being again logarithmically expanded to drive a shutter in the up-position of the mirror. The digital means performs the steps of pulse compaction, storage, expansion, retrieval and the like. The capacitor used in the analogue memory system is susceptible to self-discharge to cause an error in the stored value when it is retrieved after a prolonged period of storage time. By contrast, the digital system, while it does not suffer from such an error by virtue of its using pulses, must employ an extremely complex arrangement for the pulse compaction, storage, expansion and retrieval, which results in a very high cost.

SUMMARY OF THE INVENTION

The present invention provides a memory device for an electrical shutter for single lens reflex cameras, which is based on the digital technique incorporating an analogue-digital converter (hereinafter referred to as A-D converter) which includes a digital-analogue converter (hereinafter referred to as D-A converter) having a plurality of storage elements which correspond in number to one more than the number of manually settable steps of the shutter speed.

With the memory device according to the invention, the digital technique used for the purpose of memory operation prevents the occurrence of an error in the stored value when it is retrieved after a prolonged period of storage to operate the shutter. This is particularly advantageous when taking pictures with a self-timer.

The A-D converter contains a pulse producing oscillator whose pulses are utilized for the purpose of driving the D-A converter alone, without requiring pulse compaction, storage, expansion or retrieval as in the prior art. This allows a general arrangement to be greatly simplified, thus enabling the memory device to be provided inexpensively. A comparator having a reduced sensitivity as compared with that used in such a memory device of a prior art, and hence of low cost, can be used advantageously. In addition, the display of the shutter speed or the like can be effected in a simple manner in terms of a digital quantity, and a simplified circuit arrangement and adjustment can also be employed as compared with the other conventional systems.

DETAILED DESCRIPTION OF EMBODIMENTS OF THE INVENTION

When the output from a light receivng element, such as of CdS is to be stored in a digital form, it is necessary to provide an A–D converter which converts an analogue quantity into a corresponding digital quantity, because the resistance of the element varies in an analogue manner. The photoelectric output from the element can be fixed or stored as a digital quantity in a relatively simple manner when flip-flops are used in the A-D converter. When deriving a correct shutter speed from the stored value, it is only necessary to restore the information which is stored as a digital quantity into the original analogue quantity, which can be achieved by the use of a D-A converter. The converted analogue quantity may be utilized in a similar procedure as in the conventional electrical shutter, thus causing a capacitor in a time constant circuit to be charged or discharged in accordance with the stored value to provide a proper shutter operating time.

Either resistors or constant current sources may be used to constitute the storage elements of the D-A converter. Initially an embodiment of the invention in which the storage elements comprise resistors will be described with reference to FIG. 1. Referring to this Figure, an A-D converter 1 is shown enclosed within phantom lines, and comprises an oscillator 2 for producing pulses of a constant frequency, a memory 3 formed of flipflops which are driven by the pulses from the oscillator 2 transmitted through a gate circuit 4, a D-A converter 5 which operates in response to a digital output from the memory 3, and a comparator 7 which receives the output from the D-A converter 5 as well as the output from a light receiving element 6 of CdS. The comparator 7 is fed with the voltage developed across the resistance of the light receiving element 6 and the voltage generated by the D-A converter 5, and operates to close the gate circuit 4 at a preset condition such as when these voltages become equal to each other or when the photometric resistance of the CdS becomes equal to the equivalent resistance of the D-A converter 5. It will be appreciated that the film speeds, F-values or the like are preset in the comparator 7. Because of the functions performed, it is necessary that the comparator have a high input impedance, and a high sensitivity as well as good frequency response, and that the gate circuit 4 have a similar high performance to provide a satisfactory switching function of high frequency pulses.

Figure 2:
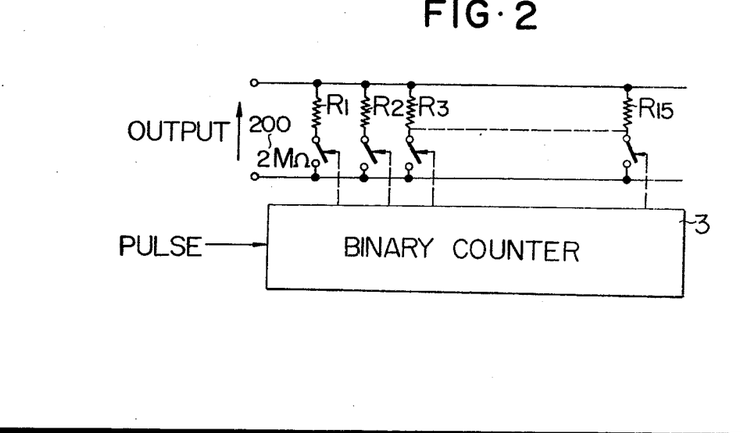
FIG. 2 is a schematic diagram illustrating the layout of weighting resistors used in the D-A converter shown in FIG. 1.

The D-A converter 5 is schematically shown in FIG. 2 as comprising 15 weighting resistors $R_1$ to $R_{15}$ L in shunt connection and having different resistance values so as to cover the entire resistance range of the light receiving element 6. Each of the resistors $R_1$ to $R_{15}$ is switched into or out of the circuit by means of the memory 3 which is shown as a binary counter comprising 15 series connected flipflop stages.

Figure 3A:
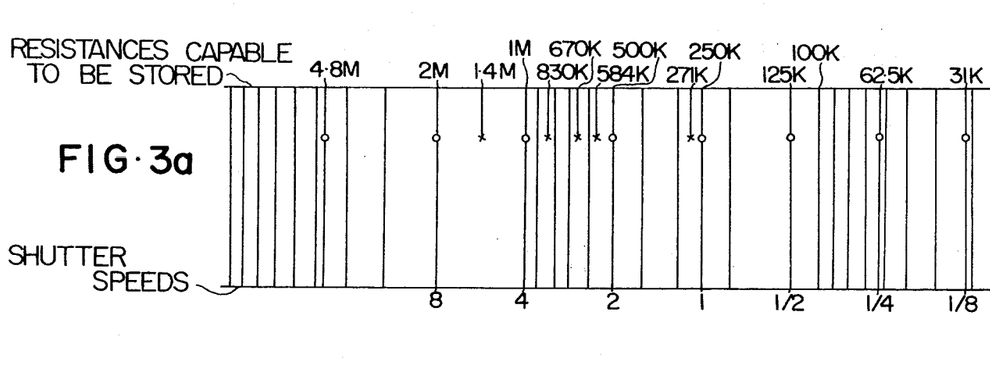
FIGS. 3a and 3b are schematic illustrations of the relationship between the resistance in the memory and the shutter speed.
Figure 3B:
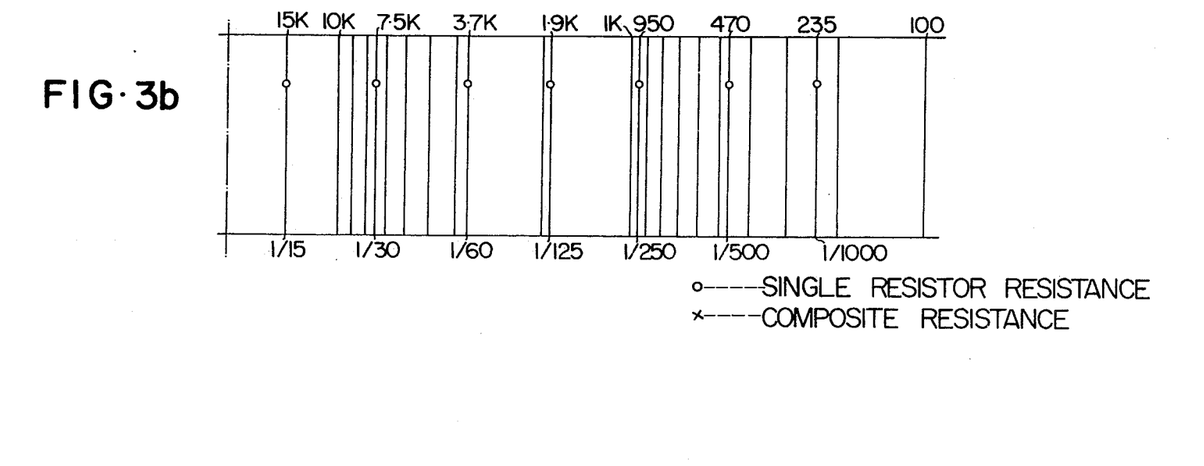

It is known that in determining the values of the weighting resistors, a binary progression may be used to determine the respective resistances. When such a technique is used to cover four decades ($10^4$) of the variable resistance of the light receiving element 6, for example, from 200Ω to 2 MΩ, at least fourteen resistors must be provided. Assuming that the resistors have a series of values as illustrated by small circles on the graph of FIG. 3, that is 2 MΩ, 1 MΩ 500 KΩ and so on, then on the higher resistance region, the variation of the composite resistance proceeds 2 MΩ, 1 MΩ, 0.67 L MΩ, and so on, so that there occurs a variation of one step as converted into F-value, between 2 MΩ and 1 MΩ. On the other hand, it is noted that the manually settable shutter speeds used with a camera include 1/1000, 1/500, 1/250, 1/125, 1/60, 1/30, 1/15, 1/8, 1/4, 1/2, 1, 2, 4, 8 seconds, so that a simple choice for the resistors comprising the D-A converter may be permitted when the binary counter comprises 14 stages by using sequentially doubled values for the weighting resistors associated with successive stages of the counter so as to correspond to the values of the shutter speeds given above. One problem remains, however, as to whether the shutter speeds established by switching the resistors of such a doubling system in a binary fashion are acceptable. Assuming that the light receiving element 6 had a characteristic of $\mu = 1$ (the light quantity versus resistance characteristic of CdS) in the region of shutter speed from 1/1000 to 8 seconds and its resistance ranges from 2 MΩ to 200Ω, when one pulse and two pulses are received from the oscillator 2, the resulting resistances will be 2 MΩ and 1 MΩ, respectively, so that the shutter speed that can be established will have a difference of a single step. To overcome this disadvantage, the binary counter is formed of 15 stages, with the resistor connected with its first stage being chosen to be 4.8 MΩ and adopting the doubling system for the resistors associated with successive stages, beginning with 2 MΩ. The shutter speeds established by such choice of resistances are depicted graphically in FIG. 3, wherein the variation between successive steps will be about 1/6 step (as considered in the series depicted by small circles) as converted into F-values for shutter speeds higher than 1 second, and at the same time intermediate steps are obtained on the higher resistance region, for example, an intermediate step of 1.4 MΩ is provided between the 2 MΩ and 1 MΩL steps of the original series, as a result of activating both the initial stages of the counter which are connected with 4.8 MΩ resistors, thus removing the disadvantage that an increased error prevails on the higher resistance region and hence providing useful shutter speeds for practical purposes.

When the weighting of the resistors is chosen in this manner, a display unit for indicating the shutter speed within the field of the finder may be constructed with a logic circuit without requiring the use of an ammeter. This is illustrated generally in FIG. 4 wherein the outputs from the binary counter 3 are introduced into OR gates $OR_1$ to $OR_n$ and AND gates $AND_1$ to $AND_n$, with the respective outputs from the AND gates $AND_1$ to $AND_n$ being fed into the display unit. Specifically illustrating the connection for the output terminals $2^{15}$, $2^{14}$ and $2^{13}$ of the binary counter, it will be seen that the output terminal $2^{15}$ is connected with the inhibit terminal of the AND gate $AND_{n-1}$ and one terminal of the OR gate $OR_n$; the output terminal $2^{14}$ is connected with the other input terminal of the AND gate $AND_{n-1}$ and the other input terminal of the OR gate $OR_n$; and the output terminal $2^{13}$ is connected with one input terminal of AND gate $AND_{n-2}$ and one terminal of OR gate $OR_{n-1}$. The output of the OR gate $OR_n$ is connected with the inhibit terminal of AND gate $AND_{n-2}$ and the other terminal of the OR gate $OR_{n-1}$. The output of the OR gate $OR_{n-1}$ is connected with the inhibit terminal of AND gate $AND_{n-3}$. In this manner, each of the outputs of the binary counter is connected with AND gates OR gates, respectively with the exception of of output terminal $2^1$. These outputs through the AND gates $AND_1$ to $AND_n$ are connected with the inputs of a display unit which displays a shutter time of 8 to 1/1000 second and also along with terminal $2^1$ are connected directly to the respective inputs of an AND gate $AND_0$. The output of the AND gate $AND_0$ is adapted to operate an overexposure display unit, while the output of the OR gate $OR_1$ is connected through an inverter I to operate an underexposure display unit.

Figure 4:
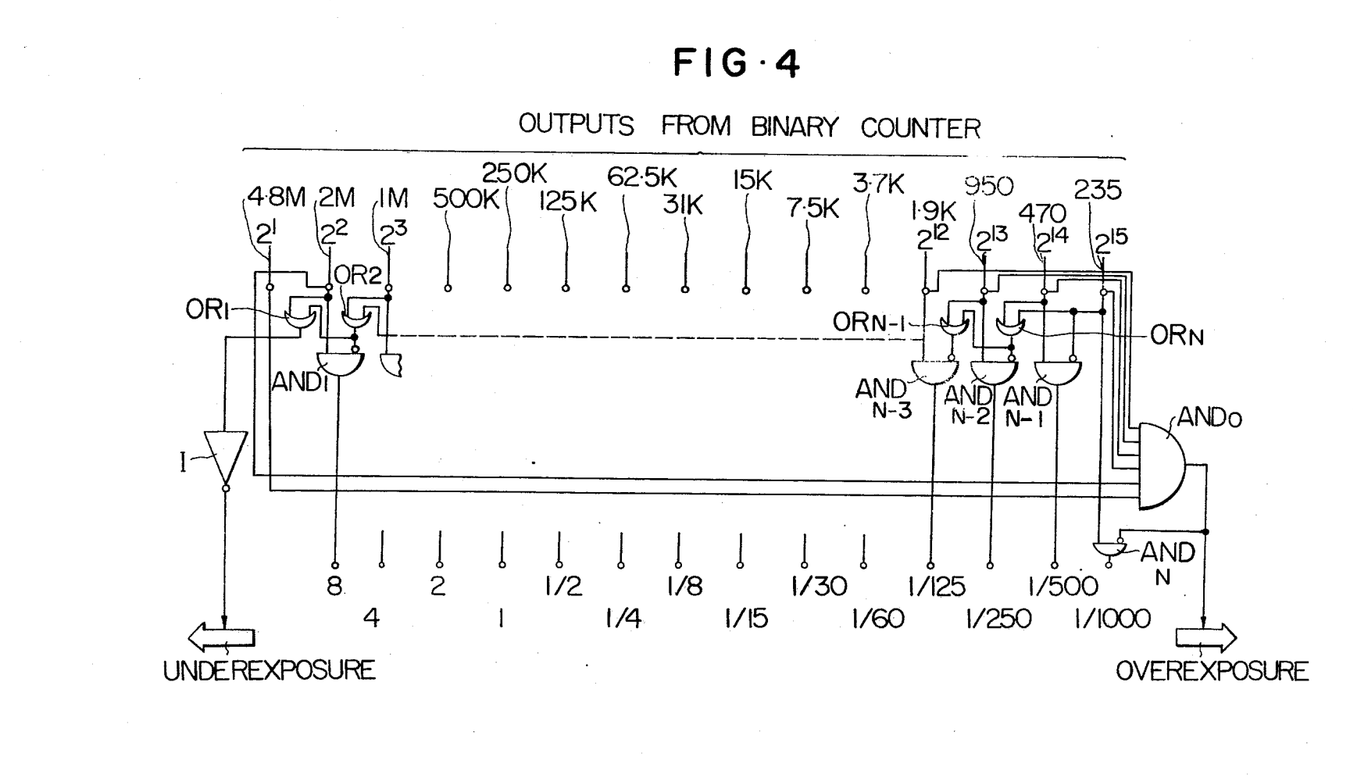
FIG. 4 is a circuit diagram of an example of a display unit which operates in response to an output from the binary counter shown in FIG. 1.

The above connection is effective to cause the display unit to provide an indication of the shutter speed in the most significant digit of the counter. For example, when the output terminals $2^1$, $2^6$ and $2^{12}$ are on to connect the respective associated resistors 4.8 MΩ, 125 KΩ, and 1.9 KΩ into circuit, the display unit will display only 1/125 corresponding to 1.9 KΩ. Since the weighting of the resistors and the shutter speed conform to a binary progression, the error in display remains within one step at maximum. In this manner, the display unit of the shutter speed can be constructed with a logic circuit in the device of the invention.

Returning to FIG. 1, the flipflops within the memory 3 are adapted to be reset by means of a reset switch $S_R$. The D-A converter 5 is connected through a changeover switch SW with the light receiving element 6, and the switch SW is transferred from A terminal to B terminal upon the actuation of the shutter release subsequent to completion of the photometry to store the photometric resistance. When the switch SW is transferred to the B terminal, the stored resistance is connected with a capacitor 8 in a time constant circuit which determines the shutter speed automatically, thereby forming a particular time constant circuit by cooperation with the capacitor 8. When the voltage across the capacitor 8 reaches a predetermined value, a switching circuit comprising Schmitt circuit 9 operates to activate a solenoid plunger 10 to close the shutter. The Schmitt circuit 9 which is automatically operated by the time constant circuit and the plunger 10 are conventional.

Figure 1:
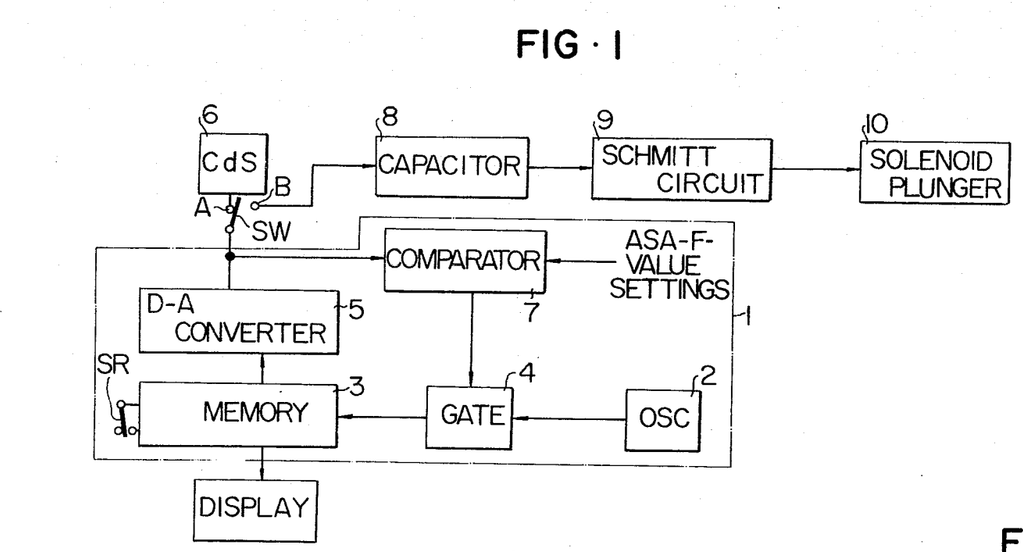
FIG. 1 is a schematic block diagram of the electrical circuit of an embodiment of the memory device of an electrical shutter for single lens reflex cameras constructed in accordance with the invention.

In operation, when the reset switch $S_R$ is closed, the flipflops within the memory 3 are reset to open the gate circuit 4, whereby the pulses from the osicllator 2 are fed therethrough into the memory 3 to switch the equivalent resistors $R_1$ to $R_{15}$ within the D-A converter 5 into circuit, starting from the higher resistance and proceeding in binary progression to the lower resistances in dependence upon the number of pulses fed. If the comparator 7 is preset to operate on a one-to-one ratio (or with a voltage ratio of ½), for example, the comparator 7 becomes activated when the photometric resistance of the light receiving element 6 is equal to the resistance of a selected resistor $R_1$ to $R_{15}$ within the D-A converter 5 to produce a signal which is applied to the gate circuit 4 to clost it, whereupon the A-D converter 1 fixes or stores the resistance which is equivalent to that of the light receiving the element 6. Subsequently, when the switch SW is transferred to the B terminal upon actuating the shutter release, a proper shutter time is automatically established as mentioned above in the similar manner as in the conventional electrical shutter.

Figure 5:
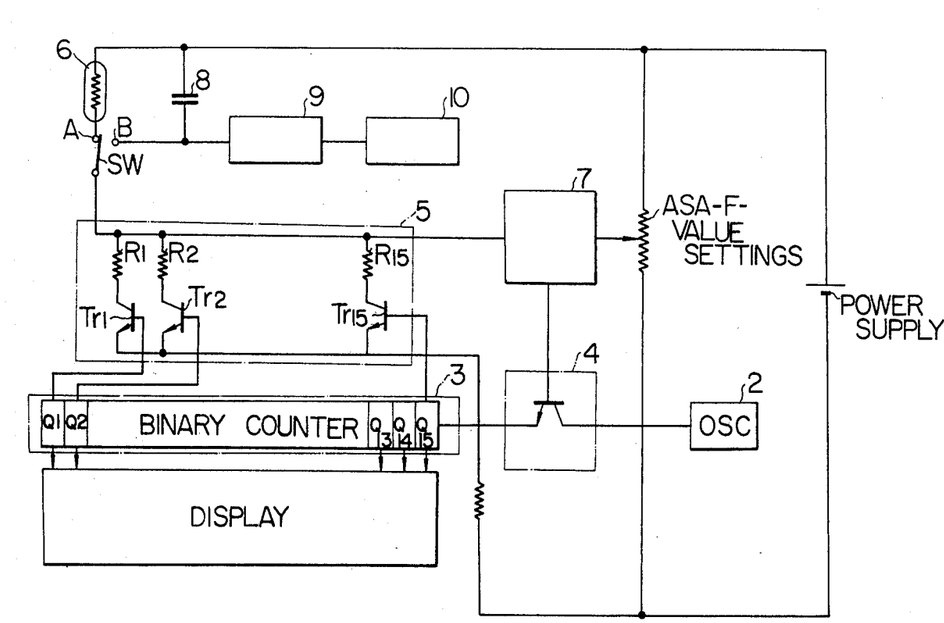
FIG. 5 is a detailed circuit diagram of the device shown in FIG. 1.

FIG. 5 shows a detailed circuit arrangement of the device according to the invention shown in FIG. 1. As shown, the D-A converter 5 comprises a plurality of resistors $R_1$ to $R_{15}$ which correspond in number to one more than the number of manually settable steps of the shutter speed, and transistors Tr1 to Tr15, while the memory 3 is formed as a binary counter comprising known flipflops $Q_1$ to $Q_{15}$. The operation of the circuit is as mentioned above, and will not be repeated again. In the present example, the light receiving element 6 comprises a CdS cell, but it should be understood that it may be replaced by a silicon cell.

Figures 6, 7:
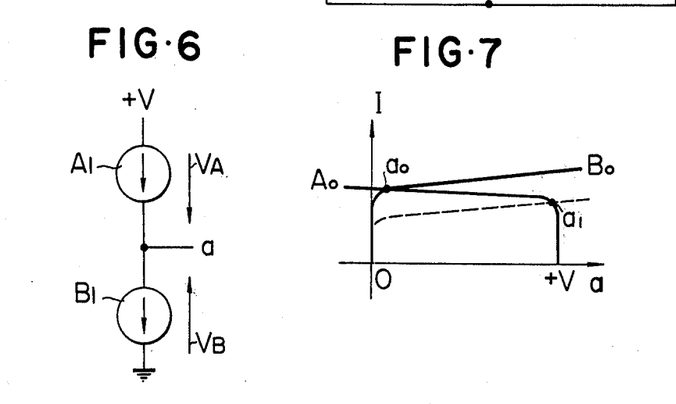
FIG. 6 is a schematic diagram for illustrating the principle of constant current sources.
FIG. 7 graphically shows characteristic curves of the constant current sources shown in FIG. 6.

Another embodiment of the invention in which the storage elements in the D-A converter comprise constant current sources will be described with reference to FIG. 9. Before dealing with this embodiment, it will be useful to consider some characteristics of the constant current sources. As is well known, a constant current source has an infinite internal impedance theoretically. Referring to FIG. 6 which shows a pair of constant current sources $A_1$ and $B_1$, the potential at the junction $a$ will vary depending upon the relative magnitudes of the current drawn from the sources $A_1$ and $B_1$. Viewing the constant current source $B_1$ connected with the ground from the point $a$, its current characteristic will be depicted by a characteristic curve $B_0$ as shown in FIG. 7, and the constant current source $A_1$ connected with voltage source +V will exhibit a characteristic curve $A_0$ when viewed from the point $a$. Thus, the potential at the point $a$ of FIG. 6 will be situated at the point of intersection between the curves $A_0$ and $B_0$. If the sources $A_1$ and $B_1$ are such that a greater current can be drawn from the source $B_1$ than the source $A_1$, the potential at the point $a$ will be at the point of intersection $a_0$ shown in FIG. 7 and is very close to the ground potential. On the contrary, if a greater current can be drawn from the source $A_1$ as compared with that drawn from the source $B_1$, the potential at the point $a$ will be shown by another point of intersection $a_1$ between $A_0$ and another curve shown by broken lines and is very close to the potential of the source +V.

Figure 8:
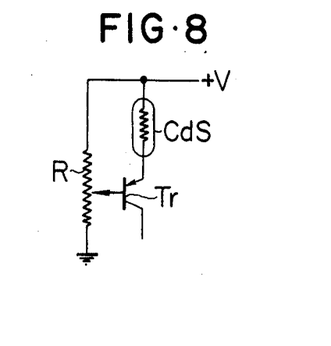
FIG. 8 is a schematic circuit diagram showing one example of an electrical circuit which constitutes a constant current source.

It follows therefore that the potential at the point $a$ can be switched from a value close to the ground potential to another value close to the source voltage +V or vice versa by changing the relative magnitude of the currents which can be drawn from the respective current sources, even though the absolute value of such current may be small. The use of such constant current sources permits a detection circuit of reduced sensitivity to be used as compared with that used in the prior art. The memory of the embodiment to be described comprises such constant current sources. A constant current proportional to the amount of light may be obtained by using a silicon cell such as solar cell directly, or alternatively by forming a constant current circuit which comprises a photoelectric transducer element of CdS and a transistor Tr as shown in FIG. 8. In this Figure, a variable resistor R is included to preset a film speed, diaphragm aperture or the like.

Figures 9, 10:
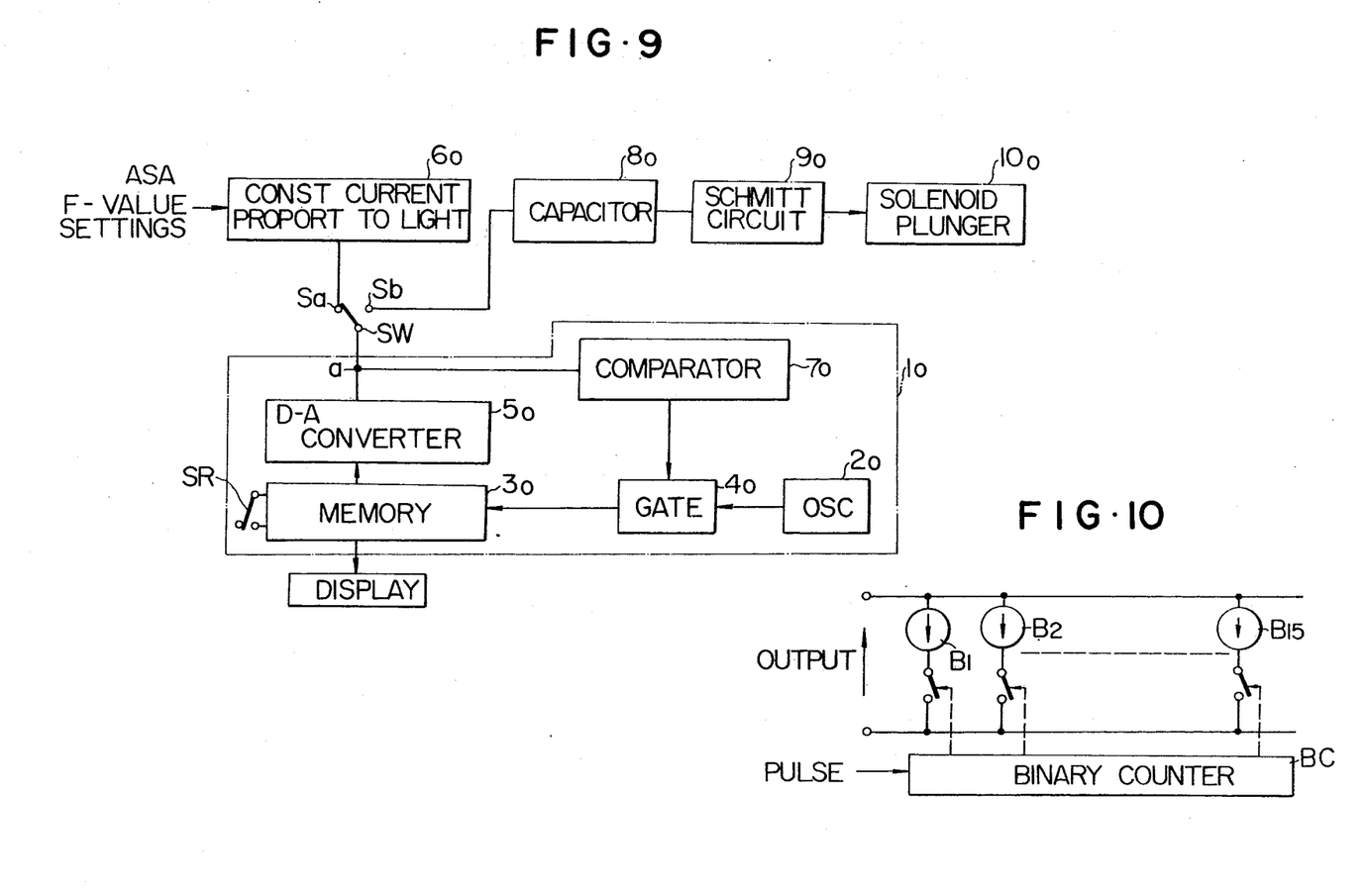
FIG. 9 is a schematic block diagram of the electrical circuit of another embodiment of the memory device for an electrical shutter for single lens reflex cameras according to the invention.
FIG. 10 is a schematic diagram showing the D-A converter shown in FIG. 9.

Referring to FIG. 9, the embodiment shown comprises an A-D converter $1_0$ shown enclosed within phantom lines. The converter comprises an oscillator $2_0$ which produces pulses of a fixed frequency, a memory $3_0$ comprising flipflops and driven by the pulses from the oscillator transmitted through a gate circuit $4_0$, a D-A converter $5_0$ which operates in response to a digital output from the memory drive $3_0$, and a comparator $7_0$ to which are applied the output of the D-A converter $5_0$ as well as the output of a constant current source $6_0$ which may comprise a silicon cell and which produces a constant current proportional to the amount of light being determined. The comparator $7_0$ operates to produce a signal for closing the gate circuit to interrupt the supply of pulses from the oscillator $2_0$ to the memory $3_0$ when the difference between the constant current derived from the constant current source $6_0$ and the constant current produced by the D-A converter $5_0$ increases to a level to activate the comparator $7_0$, which should have a good frequency response to perform such a function. Similarly, a good frequency response is required of the gate circuit $4_0$ which switches high frequency pulses.

The D-A converter $5_0$ comprises 15 constant current sources $B_1$ to $B_{15}$ connected in parallel branches so as to cover the range of variable current from the constant current source $6_0$, as shown in FIG. 10. These current sources are slectively connected into and out of circuit by means of a binary counter BC which comprises series connected fifteen flipflops. Each time a pulse is fed into the binary counter BC, a selected one of the current sources $B_1$ to $B_{15}$ is connected into the circuit for arithmetic addition in a sequential manner. The use of such constant current sources $B_1$ to $B_{15}$ to form the D-A converter $5_0$ permits a display unit to be constructed with a logic circuit, without requiring an ammeter or the like, for displaying the shutter speed within the field of the finder.

Figure 11:
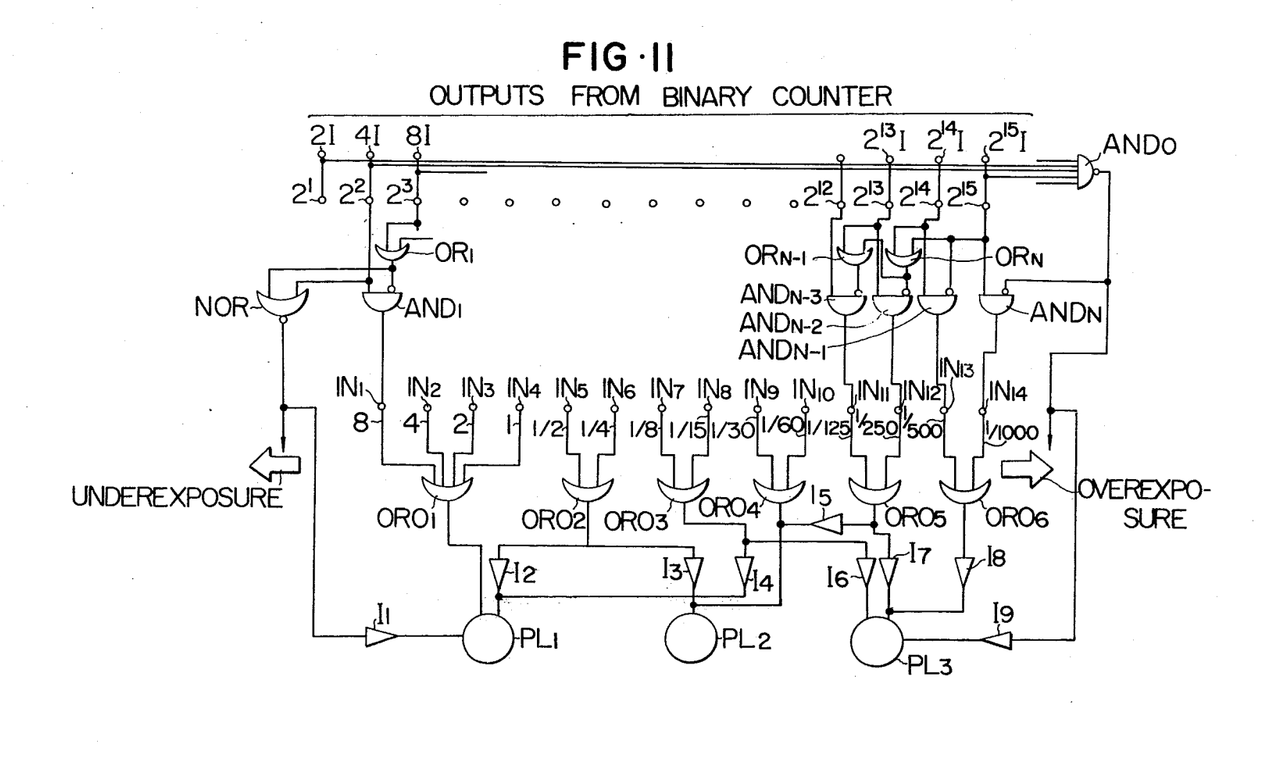
FIG. 11 is a schematic diagram of the electrical circuit of another example of the display unit which operates in response to an output from the binary counter shown in FIG. 10.

An example of such a display unit is shown generally in FIG. 11 wherein it will be noted that the outputs of the binary counter BC ae introduced into OR gates $OR_1$ to $OR_n$ and AND gates $AND_1$ to $AND_n$, with the outputs from the respective AND gates $AND_1$ to $AND_n$ being fed into a display unit. Specifically illustrating the connection for the output terminals $2^{15}$, $2^{14}$ and $2^{13}$ of the binary counter, it will be seen that the output terminal $2^{15}$ is connected with the inhibit terminal of the AND gate $AND_{n-1}$ and one terminal of the OR gate $OR_n$; the output terminal $2^{14}$ is connected with the other input terminal of the AND gate $AND_{n-1}$ and the other input terminal of the OR gate $OR_n$, with the output of the OR gate $OR_n$ being connected with the inhibit terminal of an AND gate $AND_{n-2}$ and one terminal of an OR gate $OR_{n-1}$; and the output terminal $2^{13}$ is connected with the other input terminal of the AND gate $AND_{n-2}$ and the other input terminal of the OR gate $OR_{n-1}$, with the output of the OR gate $OR_{n-1}$ being connected with the inhibit terminal of the AND gate $AND_{n-3}$. In this manner, each of the outputs of the binary counter is successively connected with sequential AND gates and OR gates with the exception of output terminals $2^1$ and $2^2$. These outputs through the AND gates $AND_1$ to $AND_n$ are connected with the respective inputs of a display unit which displays a shutter time of 3 to 1/1000 second, and also along with terminals $2^1$ and $2^2$ directly to respective inputs of an AND gate $AND_0$. The output of the AND gate $AND_0$ is connected with the inhibit terminal of the AND gate $AND_n$, the other input terminal of which is connected with the output terminal $2^{15}$, and also adapted to operate an overexposure display unit, while the output terminal $2^2$ of the binary counter as well as the output of the OR gate $OR_1$ are connected through a NOR gate NOR to operate an underexposure display unit.

The display unit for indicating a shutter time of from 8 to 1/1000 second has its input terminals $IN_1$ to $IN_4$ connected with an OR gate $ORO_1$, its input terminals $IN_5$ and $IN_6$ connected with an OR gate $ORO_2$, its input terminals $IN_7$ and $IN_8$ connected with an OR gate $ORO_3$, its input terminals $IN_9$ and $IN_{10}$ connected with an OR gate $ORO_4$, its input terminals $IN_{11}$ and $IN_{12}$ connected with an OR gate $ORO_5$, and its input terminals $IN_{13}$ and $IN_{14}$ connected with an OR gate $ORO_6$, respectively. The respective outputs of these OR gates $ORO_1$ to $ORO_6$ and the outputs of the NOR gate NOR and the AND gate $AND_0$ are connected either directly or through buffers $I_1$ to $I_9$ with three indicator lamps $PL_1$ to $PL_3$ which are adapted to emit radiation of different colors, for example, red, green and blue, respectively. The above connection is effective to cause the display unit to display only the shutter speed associated with the most significant digit in the counter. For example, when the current sources associated with the shutter speeds of 1/4, 1/60 and 1/500 are turned on, only the blue lamp $PL_3$ will be lit, indicating the shutter speed or 1/500 second. Because of the weighting used in the constant currents and shutter speeds which conform to the binary progression, an error in the display remains within one step at maximum. The display unit thus constructed illuminates a selected lamp or lamps according to a selected scheme, as illustrated below.

Blue lamp $PL_3$ lit for 1/1000 to 1/500 second;
Green and blue lamps $PL_2$ and $PL_3$ lit for 1/125 to 1/250 second;
Green lamp $PL_2$ lit for 1/30 to 1/60 second;
Red and blue lamps $PL_1$ and $PL_3$ lit for 1/8 to 1/15 second;
Red and green lamps $PL_1$ and $PL_2$ lit for 1/2 to 1/4 second;
Red lamp $PL_1$ lit for 8 to 1 second.

In this manner, the display unit for indicating the shutter speed can be constructed with the logic circuit when the device according to the invention is employed.

Returning to FIG. 9, the flipflops in the memory $3_0$ are adapted to be reset by means of a reset switch $S_R$. The D-A converter $5_0$ is connected with the constant current source $6_0$ through a change-over switch SW during the photometry, and the switch SW is transferred from a terminal $S_a$ to another terminal $S_b$ upon actuation of the shutter release subsequent to the completion of the photometry and storage of the photometric current. When the switch Sw is transferred to the terminal $S_b$, the stored current will be connected to be supplied to a capacitor $8_0$ which automatically determines a shutter speed by charging or discharging the capacitor with the stored constant current derived from the D-A converter. A switching circuit comprising Schmitt circuit $9_0$ is operated in response thereto to activate a solenoid plunger $10_0$ for closing the shutter. The Schmitt circuit $9_0$ which operates automatically in this manner as well as the plunger $10_0$ are conventional.

In operation, when the reset switch $S_R$ is closed to reset the flipflops in the memory $3_0$, the gate circuit $4_0$ is opened, so that the pulses produced by the oscillator $2_0$ are fed therethrough into the memory $3_0$ whereby a current source of an increasingly greater current capacity will be successively connected into circuit in depedence upon the number of pulses supplied. As soon as the constant current derived from the D-A converter $5_0$ exceeds the current proportional to the amount of light incident, the potential at the point a will switch from a value near +V to a value near 0. Thereupon, the comparator $7_0$ detects such change to close the gate circuit $4_0$, so that the A-D converter $1_0$ can fix and store the pulses proportional to the amount of incident light. Subsequently, when the switch SW is transferred to the terminal $S_b$ upon the actuation of the shutter release, a proper shutter operating time is automatically determined by a procedure similar to that used in the conventional electrical shutter.

Figure 12:
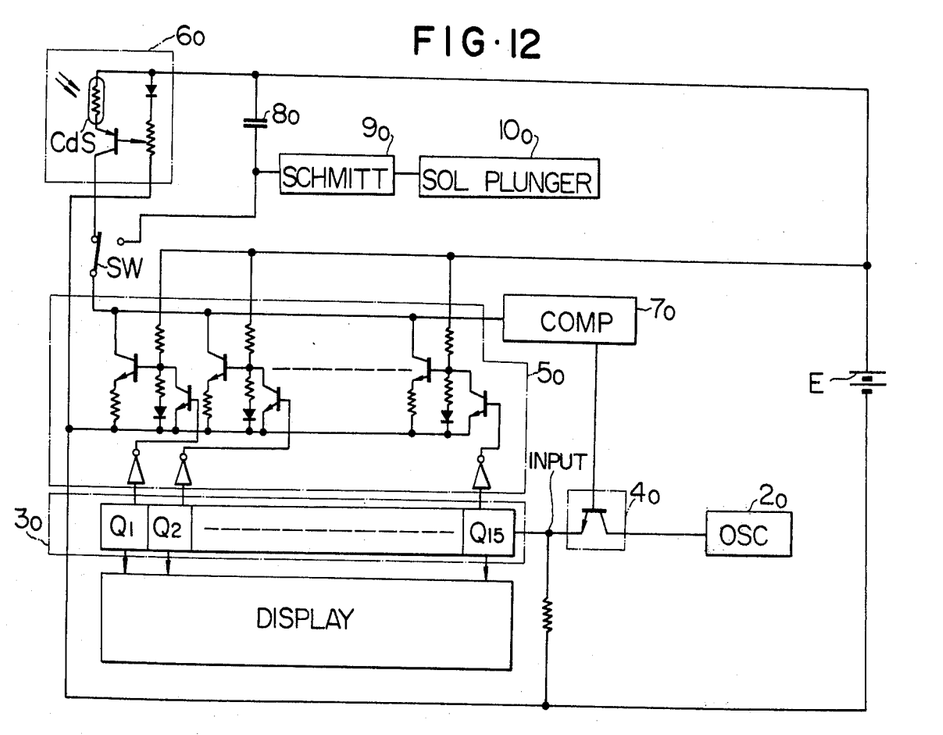
FIG. 12 is a detailed circuit diagram of the device shown in FIG. 9.

FIG. 12 shows a detailed circuit connection of the device shown in FIG. 9, and corresponding parts are designated by like numerals and therefore its operation will not be described in detail.

Figure 13:
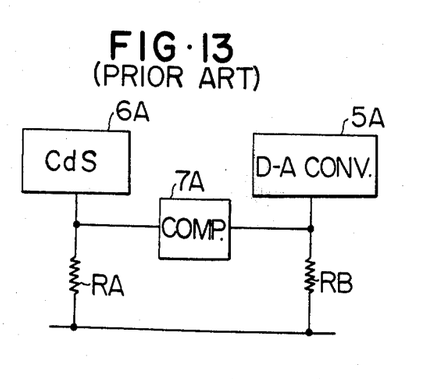
FIG. 13 is a block diagram of a comparator used in the prior art.

A significant feature of the invention is the relative arrangement of the photoelectric transducer element 6 or $6_0$ (FIGS. 1 and 9) and the D-A converter 5, $5_0$. The prior art arrangement is shown in FIG. 13, wherein it will be noted that a photoelectric transducer element or light receiving element 6A and a voltage dividing resistor RA are connected in series, with their junction connected to one input of a comparator 7A, while a D-A converter 5A and a voltage dividing resistor RB are also connected in series, with their junction connected to the other input of the comparator 7A. Because the range of variable resistance of the light receiving element 6A covers at least four decades ($10^4$), it will be appreciated that when a supply voltage of 6 volts is used and the light receiving element 6A has a variable resistance which ranges from 2 m$\Omega$ to 200$\Omega$, an optimum balance will be achieved by choosing the voltage dividing resistors RA and RB on the order of 20 K$\Omega$. However, considering the situation that the comparator 7A will be called upon to detect maximum or minimum resistances of 2 M$\Omega$ or 200$\Omega$, it must be capable of detecting as small a voltage as 60 mV, which results in a non-uniformity in the accuracy in detecting the extreme resistance and the median resistance which are contained in the variable resistance range of the light receiving element 6A. In addition, the comparator must have a detection capability well over 60 mV in order to detect an error corresponding to one step in F-value.

Figure 14:
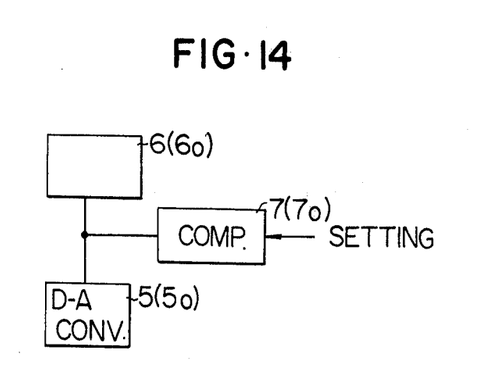
FIG. 14 is a block diagram of the comparator used in the invention.

By contrast, in the device of the invention, the relative arrangement of the light receiving element 6 or current source $6_0$ and the D-A converter 5 or $5_0$ with respect to the comparator 7 or $7_0$ is such as is shown in FIG. 14. Directly coupling the light receiving element 6, $6_0$, with the D-A converter 5, $5_0$ permits a detection to be conducted at the maximum sensitivity of the comparator 7, $7_0$ or in other words, under the condition in which a variation in the output voltage for a given amount of change of the D-A converter 5, $5_0$ is greatest. In this manner, a comparator can be used which needs only to have a detection capability on the order of 1 volt, for example, in order to allow the detection of an error corresponding to one step in F-value.

Since the D-A converter 5, $5_0$ used in the device of the invention comprises a parallel branch connection of at least 15 resistors $R_1$ to $R_{15}$ having different resistance values or 15 constant current sources $B_1$ to $B_{15}$ corresponding to the respective steps of the shutter speed which cover the variable resistance range of the light receiving element 6, $6_0$ and since each of these branches are switched on and off by series connected, fifteen flipflops stages, it will be appreciated that there will be $2^{15} = 32,768$ combinations of the resistors or constant current sources when these flipflops are operated in a binary fashion. This means that a maximum of 32,768 pulses are required in the extreme instance. This would present a problem in view of the length of the pulse counting time required. The length of such counting time can be reduced by using a well-kown converter of sequential comparison type.

Figure 15:
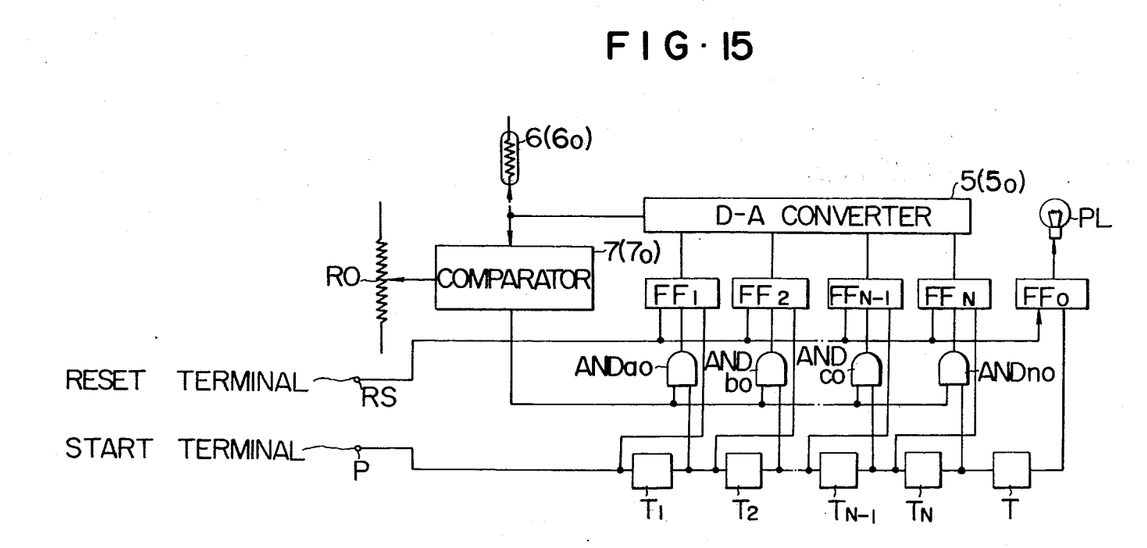
FIG. 15 is a schematic circuit diagram of one example of D-A converter of sequential comparison type.

FIG. 15 shows a digital device incorporating such a converter of sequential comparison type. A counter of sequential comparison type does not have a main gate, but instead, when a pulse is fed to a start terminal P, it is successively shifted through a plurality of delay circuits $T_1, T_2 \ldots T_n$, and driving the flipflops $FF_1, FF_2 \ldots FF_n$ through AND circuits $AND_{a0}, AND_{b0} \ldots AND_{n0}$ for the purpose of comparing the constant current from the converter $5_0$ with that from the constant current sorce $6_0$ or comparing the resistance in the D-A converter 5 with that of the light receiving elememt 6. When a counter circuit of such sequential comparison type is used, an additional delay circuit T is connected to the last delay circuit $T_n$ of the series, and an additional flipflop $FF_0$ is connected next to the last flipflop $FF_n$ so that the flipflop $FF_0$ may be operated by an output from the delay circuit T to produce an output which illuminates a display element PL such as a lamp.

In this manner, the pulse counting time can be substantially reduced and the display element PL may be illuminated upon completion of the photometry. The flipflops which operated in order to store the photometric value will be reset by a reset signal applied to a reset terminal $R_S$. In FIG. 15, a resistor $R_0$ is shown for presetting the film speed, F-value or the like.

What is claimed is:

1. In a memory device of an electrical shutter for single lens reflex cameras wherein light which is transmitted through the taking lens is measured and converted into an electric photometric value by a light receiving element to provide an indication of an appropriate shutter speed, the improvement comprising: an A-D converter including a memory means for storing said photometric value by conversion into a digital quantity; a D-A converter having a plurality of storage means, which correspond in number to one more than the number of manually settable shutter speeds, for receiving the output of said memory means and producing an output indicative of an appropriate shutter speed; three illuminating elements, each producing light of a different color; and means for receiving said indicative output and lighting only said three illuminating elements in six different combinations respectively indicative of the appropriate shutter speed.

2. A memory device according to claim 1 wherin said means for receiving and lighting further comprises a logic circuit comprising OR gates and AND gates connected between said storage means and said illuminating elements.

3. A device of an electrical shutter for single lens reflex cameras comprising:
  a. an oscillator for producing pulses of a fixed frequency;
  b. a memory means for receiving and storing said pulses;
  c. a gate circuit for controlling the introduction of said pulses into said memory means;
  d. a D-A converter having a plurality of resistors which correspond in number to one more than the number of shutter speed steps for receiving the output of said memory means;
  e. a light receiving element which measures light transmitted through the camera taking lens;
  f. comparator means for receiving the outputs of said light receiving element and said D-A converter and operative, when the photometric resistance of the light receiving element reaches a predetermined level with respect to a resistance determined by said memory means output in the D-A converter, to close the gate circuit, whereby a resistance equivalent to the photometric resistance of the light receiving element is stored in the memory means to provide an indication of an appropriate shutter speed step;

g. three illuminating elements each producing light of a different color; and h. means for receiving said indication of said equivalent resistance and lighting only said three illuminating elements in six different combinations respectively indicative of the appropriate shutter speed step.

4. A memory device according to claim 2 in which the light receiving element and the D-A converter are directly coupled during the photometry so as to introduce the output of the light receiving element and the output of the D-A converter into said comparator means simultaneously.

5. A device as in claim 3 wherein said means for receiving and lighting further comprises a logic circuit comprising OR gates and AND gates connected between said memory means and said illuminating elements.

6. A device of an electrical shutter for single lens reflex cameras comprising:

a. means, including a light receiving element which measures light transmitted through the camera taking lens, for producing a constant current proportional to the amount of light measured;

b. an oscillator for producing pulses of a fixed frequency;

c. memory means for receiving and storing the pulses;

d. a gate circuit for controlling the introduction of the pulses into said memory means;

e. converter means including a D-A converter having a plurality of constant current sources which correspond in number to one more than the number of shutter speed steps and responsive to the output of the memory means for producing constant currents scaled in a binary fashion indicative of respective shutter speed steps;

f. comparator means for comparing a selected constant current produced by said converter means according to the output of said memory means and the constant current proportional to the amount of light and operative, when a difference between the currents exceeds a given value, to close the gate circuit to permit the constant current proportional to the amount of light measured to be stored in said memory means to provide an indication of an appropriate shutter speed step;

g. three illuminating elements, each producing light of a different color; and h. means for receiving the constant current stored in said memory means and lighting only said three illuminating elements in six different combinations respectively indicative of the appropriate shutter speed step.

7. A device as in claim 6 wherein said means for receiving and lighting further comprises a logic circuit comprising OR gates and AND gates connected between said memory means and said illuminating elements.

* * * * *